United States Patent [19]
Bedi

[11] Patent Number: 5,295,521
[45] Date of Patent: Mar. 22, 1994

[54] SELF-CONTAINED FUEL FILLER SYSTEM

[75] Inventor: Ram D. Bedi, Birmingham, Mich.

[73] Assignee: K.J. Manufacturing Co., Wixom, Mich.

[21] Appl. No.: 17,653

[22] Filed: Feb. 12, 1993

[51] Int. Cl.$^5$ .............................. B67D 5/54; B65B 3/18
[52] U.S. Cl. .............................. 141/59; 220/DIG. 33;
141/382; 141/383; 141/387; 141/302
[58] Field of Search .............. 141/382, 383, 387, 302,
141/44–46–59, 346; 220/DIG. 33

[56] References Cited

U.S. PATENT DOCUMENTS

| | | | |
|---|---|---|---|
| 3,513,887 | 5/1970 | Limandri | 141/346 X |
| 3,863,688 | 2/1975 | Millar et al. | 141/59 |
| 4,109,686 | 8/1978 | Phillips | 141/1 |
| 4,306,594 | 12/1981 | Planck | 141/59 |
| 4,310,033 | 1/1982 | Deters | 141/44 |
| 4,763,683 | 8/1988 | Carmack | 141/346 X |
| 4,828,183 | 5/1989 | Fink, Jr. | 239/569 |
| 4,907,630 | 3/1990 | Kulikowski et al. | 141/384 |
| 5,038,840 | 8/1991 | Fair | 141/83 |
| 5,042,678 | 8/1991 | Munguia | 220/DIG. 33 X |
| 5,184,654 | 2/1993 | Benzing | 141/287 |

OTHER PUBLICATIONS

Panker "Non-Spill Couplings"–Quick Coupling Division Minneapolis Minn.

Primary Examiner—Ernest G. Cusick
Attorney, Agent, or Firm—Basile and Hanlon

[57] ABSTRACT

An apparatus for introducing fluid having a volatile organic component from one container, for example, a fuel storage vessel to a receiving container such as an on-board fuel storage tank of an automotive vehicle with reduced discharge of organic vapors into the surrounding atmosphere, the apparatus including a filler cap having at least one positively sealing quick connect fitting through which fluid can be introduced which is releasable attachable with a mating fitting located on the filler nozzle of an external fluid delivery device. The apparatus also including at least one vapor conveying fitting located in the filler cap which is matingly engagable with a fitting located on an externally positionable organic vapor conveying conduit located in proximity to the fluid dispensing nozzle such that, when engaged, a circuit is completed wherein fluid is introduced into the receiving container such as the on-board fuel tank of an automotive vehicle and any organic vapors displaced during the operation are returned to the storage container without contact with the surrounding environment.

15 Claims, 2 Drawing Sheets

SELF-CONTAINED FUEL FILLER SYSTEM

BACKGROUND OF THE INVENTION

1. Field of the Invention

The present invention relates to method and devices for transferring fluids such as volatile fuel materials from one container such as a remote fuel storage tank to another container such as an on-board fuel storage tank of an automotive vehicle in a safe and efficient manner with minimal or no escape of vapors and fluid to the environment. More particularly, the present invention pertains to methods and devices for introducing volatile fuels such as gasoline into an automotive vehicle in an environmentally safe manner which permits little or no discharge of hydrocarbon into the surrounding atmosphere.

2. Brief Discussion of Relevant Art

The need for transfer of fluids having a volatile component from one container to another such as from a storage container to a fluid delivery receptacle arises in many different situations. In such situations there is often a great advantage to being able to transfer the fluids with little or no contact between the fluids, vapors displaced during the transfer process and the surrounding external environment.

For example, the introduction of fuel to the on-board fuel storage tank of an automotive vehicle presents various concerns regarding environmental and user safety. Specific among these are concerns regarding spillage of liquid fuel outside of the on-board storage tank before or after refueling procedures, exposure of the individual performing the refueling operation to liquid fuel and/or fuel vapors, and introduction of hydrocarbon emissions into the atmosphere before, during and after the refueling operation.

Heretofore, great attention was focused on elimination of unwanted spillage of liquid fuel before, during and after the refueling operation. To overcome such problems, modern fuel pumping devices are equipped with various sensors and automatic shut-off devices which can prevent addition of fuel to an over-full on-board storage tank. Additionally, fuel filler nozzles are equipped with manually operable triggers which serve to regulate and control the flow of the major portion of the fuel during the refueling operation. However, such devices fail to completely prevent the spillage of residual liquid present in the nozzle.

Such devices fail to address the significant problem of gaseous hydrocarbon emissions produced and discharged before, during and after the refueling operation. In recent years, scientists and the society in general have come to appreciate the detrimental impact uncontrolled hydrocarbon emissions have had and will continue to have on the environment such as smog formation in Los Angeles. Hydrocarbon emissions may adversely impact the global environment as a whole; while, on a more personal level, long term exposure to elevated levels of hydrocarbons such as those generated during refueling operations may contribute to increased risks for health hazards such as cancer and the like.

These dangers have been well recognized and attempts have been made to combat the problem through governmentally mandated retrofits of existing fuel delivery systems under the Clean Air Act of 1990. The problem cannot be underestimated. In Chicago alone, one major gasoline supplier estimates that at least 32 tons of gasoline fumes per day are released into the atmosphere due to refueling operations at its facilities.

Many devices have been proposed to reduce or limit the emission of hydrocarbons from sources such as those generated during refueling operations. These efforts have been fostered and mandated by the promulgation of new, tougher standards for hydrocarbon emissions levels. Among the devices and methods proposed for reducing hydrocarbon emissions during refueling operations are the addition of hydrocarbon capture canisters to the filler line of each automotive vehicle. Such devices would capture hydrocarbons in an adsorptive media such as activated carbon as the gaseous hydrocarbons are emitted to prevent their escape into the surrounding atmosphere. Carbon canisters such as those proposed would be costly additions to new vehicles and can also present undesirable safety hazards. For this reason, proposed legislation mandating such measures have been vetoed and met legislation resistance for a number of years. Furthermore, in order to accomplish the sought after reduction in total refueling-related hydrocarbon emissions, carbon canisters would also have to be added to existing vehicles as costly retrofits.

Unfortunately, such adsorptive canisters will not provide maximum reduction or elimination of hydrocarbon emissions and fuel spillage. Adsorptive canisters will still permit a portion of the gaseous hydrocarbons to escape. Additionally, as the adsorptive canisters become saturated, replacement will be required at further expense to the operator of the vehicle. Because appropriate and timely replacement of spent or saturated adsorptive canisters would be necessary to achieve maximum reduction in hydrocarbon emissions, a great deal of the success of such a program would rely on operator compliance. It has been the general experience that operators in general are adverse to large expenditures related to environmental compliance. Therefore capital will have to be dedicated to "over-designing" such devices to prevent premature failure and to eliminate excessive need to replace the adsorptive canisters. Even so, it is foreseeable that governmental resources will be required to ensure that the vehicles remain in compliance with emission standards through ne emission testing and the like.

Alternately, in an attempt to avoid the cost and confusion of such service station retrofits, various modifications have been proposed in the design of the fuel dispensing nozzle employed at most commercial gas stations. In areas not targeted by the Clean Air Act, examples of such modifications can include the addition of a cowl over the fuel dispensing nozzle. The cowl has an outer edge designed to engage the surface body panel surrounding the fuel filler opening to prevent the escape of fuel vapors during refueling. Such cowl designs do not prevent the escape of significant quantities of the hydrocarbon vapors which accumulate in the cowl and are released when the fuel filler nozzle is disengaged. A second embodiment of the cowl device is a deformable disc-like flange attached to the fuel filler nozzle which is adapted to roughly fit in the body opening located in most passenger vehicles in which the fuel filler nozzle is located. This device does not capture significant portion of the emitted fuel vapors. Devices which more aggressively address the problem of emitted fuel vapors include mechanisms commonly referred to as "boots" or "bellows" generally referred to as Stage II vapor recovery controls. These systems generally include rubberized sleeves which fit over the fuel delivery nozzle and cover the fuel filler opening on an automotive vehicle to capture fuel vapors displaced during refueling operations. The vapors are conveyed back to the remote fuel storage site by one of two vapor recovery methods either a balance system or vacuum assisted recovery.

A third type of device which has been proposed are co-axial nozzle systems which include a vapor recovery channel within the fuel delivery nozzle In such systems, fuel vapors dislocated during fuel delivery are sucked into small holes located at the fuel dispensing tip of the nozzle and covered through the dispensing hose.

None of the systems which have been proposed addresses the problem of spillage prior to, during, or immediately after the refueling operation. This is particularly true with regard to spillage of residual fuel contained in the fuel filler nozzle. Regardless of the nozzle shut-off system, a few drops invariably drip from the nozzle onto the ground or other surfaces further increasing the hydrocarbon emission level achieved as a result of the total refueling operation.

Thus it is desirable to provide a device which would significantly reduce the level of gaseous hydrocarbons released before, during and after the refueling of a variety of automotive vehicles and as a result of spillage. It is also desirable to provide a refueling process and device which can essentially eliminate all hydrocarbon emissions generated as a result of refueling operations.

It is also desirable to provide a process and device which integrates the vehicle to be refueled and the refueling station into an essentially closed a system, rather than treating the refueling operation as the temporary connection of two isolated elements. It is also desirable to provide a device which can eliminate gaseous hydrocarbon emissions in an economical manner which is easy to maintain, and easy to employ on and with existing automotive equipment and in existing refueling systems and, hence, minimizing the costs of retrofitting the vehicle as well as the fuel pump.

SUMMARY OF THE INVENTION

The present invention is an apparatus and process for refueling an automotive vehicles having an on-board fuel storage tank in which the automotive vehicle and the refueling device are temporarily linked in an integrated closed loop manner thereby achieving a significant reduction in, if not the complete elimination of, volatile hydrocarbon emissions produced during refueling operations.

The hydrocarbon discharge abatement apparatus of the present invention includes means for dispensing fuel from a fuel storage tank or site remote from the automotive vehicle into the on-board fuel storage tank of the automotive vehicle. The fuel dispensing means of the present invention comprises a fuel filler nozzle device which releasably mates with the fuel receiving opening of the automotive vehicle. The fuel filler nozzle device has a fuel directing conduit with means for interrupting the flow of fuel passing through the conduit. The fuel directing conduit of the fuel filler nozzle device has a fuel inlet orifice, an opposed fuel outlet orifice, and means located proximate to the fuel outlet orifice for mating with the fuel inlet opening of the automotive vehicle to be refueled in a sealing close loop manner thereby establishing positive fluid communication between the fuel filler nozzle device and the fuel filler line of the automotive vehicle. The fuel filler nozzle device is, itself, connected to a suitable remote fuel storage tank or site by means of a suitable fuel conveying conduit or conduits. The conduit or conduits can include suitable pumps, metering devices, and the like to permit the dispensation of fuel as desired.

The on-board device of the present invention which is in sealing engagement with the fuel inlet opening of the automotive vehicle also has at least one vapor discharge outlet located therein which establishes a vapor communication channel between the automotive vehicle storage tank and the other remote storage tank from where the fluid is to be transferred therethrough which is connected to a vapor-conveying conduit. The vapor-conveying conduit is in fluid communication with the remote fuel storage site to convey fuel vapors produced or expelled during refueling operations back to the remote storage tank.

The hydrocarbon discharge abatement device of the present invention also includes specifically configured means for receiving fuel into the on-board storage tank of the automotive vehicle. The fuel receiving means includes a specially configured fuel filler cap releasably and sealingly matable with the fuel receiving opening of the automotive vehicle. The filler cap of the present invention has an essentially flat planar surface member oriented in a plane perpendicular to a longitudinal axis defined by the fuel filler line of the automotive vehicle when the cap is in sealing engagement therewith. The flat planar surface of the fuel filler cap has an inner face engagable with the inlet in the fuel filler line of the automotive vehicle, an opposed upper face, at least one fuel receiving aperture extending therethrough, and at least one fitting for effecting positive closure of the fuel receiving aperture. The fuel receiving aperture fitting is permanently positioned in and extends through the flat planar surface of the fuel filler cap. The fuel receiving aperture fitting is adapted to mating connection with a compatible fitting on the fuel filler nozzle device. The fuel receiving aperture fitting can have either a male or female configuration. If it is male, the fitting can extend outwardly from the upper face of the flat planar surface of the fuel filler cap. If it is female, the fitting may be essentially flush with the upper face of the cap. The flat planar surface of the fuel filler cap of the present invention also has at least one aperture for releasing hydrocarbon vapor from the fuel filler line, the vapor releasing aperture also having a fitting permanently positioned in and extending outwardly from the upper face of the flat planar surface of the fuel filler cap of the present invention. The vapor receiving fitting is engagable in a mating fitting member located on the fuel filler nozzle.

The fuel filler nozzle device of the present invention has a fitting mounted proximate to the fuel outlet orifice with means for releasably engaging the fitting located in the fuel receiving opening of the automotive vehicle to establish fluid communication between the fuel filler conduit on the fuel filler nozzle and the fuel filler line of the automotive vehicle.

BRIEF DESCRIPTION OF THE DRAWING

To further illustrate the present invention, the following drawing is provided in which like reference numerals are employed for the various elements throughout the several figures and in which:

FIG. 4 is a perspective view of an alternate embodiment of the fuel filler cap of the present invention in which the fittings employed are female fittings; and FIG. 5 is a schematic view of the vapor return line and its connection with the remote fuel storage tank of the present invention via the fuel storage tank cap cover.

DESCRIPTION OF THE PREFERRED EMBODIMENT

Figure 1:
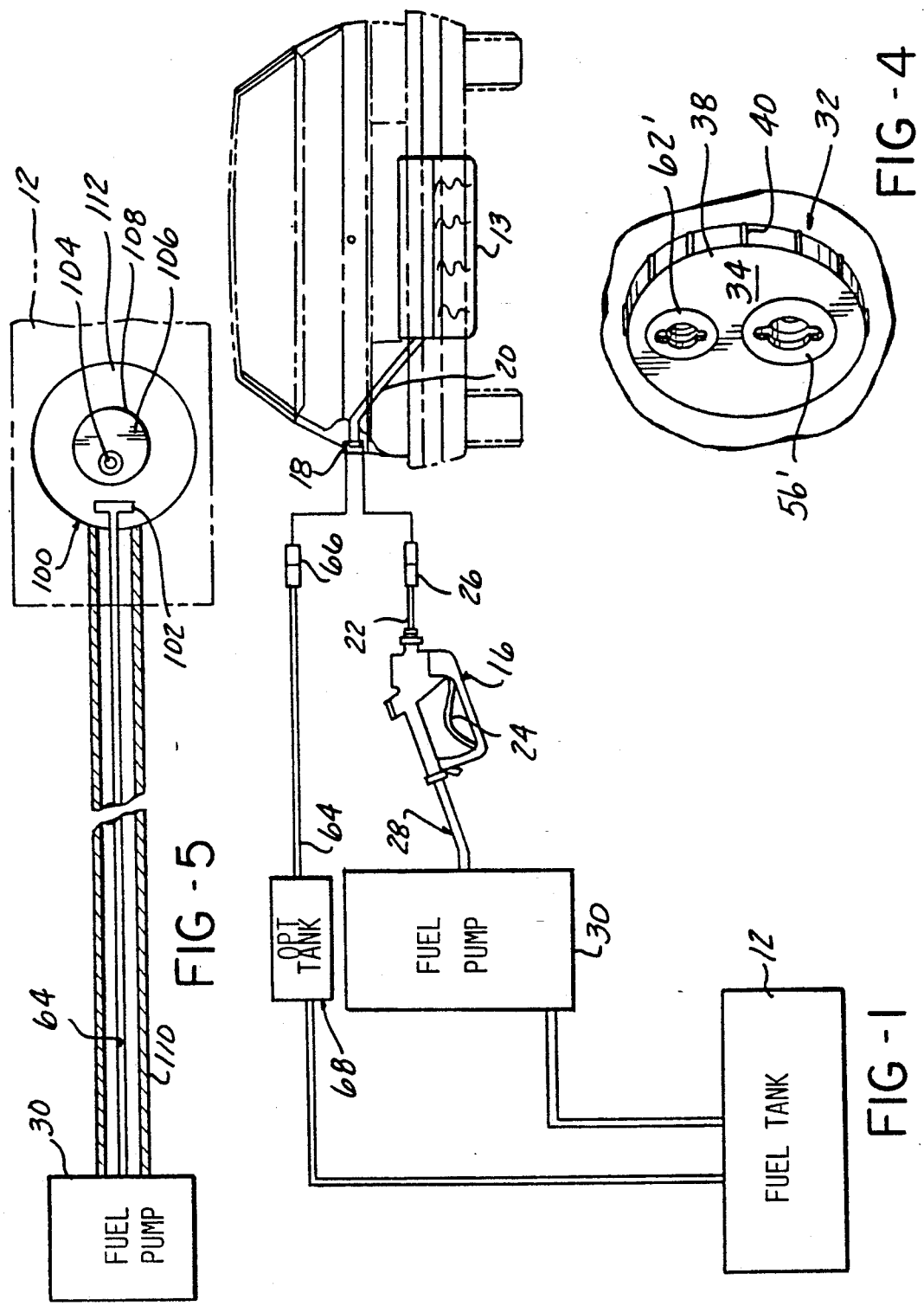
FIG. 1 is a schematic view of the self contained fuel filler system of the present invention.

The present invention is a method and apparatus for reducing and/or eliminating chemical vapor emissions produced during fluid transfer operations such as those involved in refueling. The chemical emissions can include organic vapors and certain inorganic vapors. In the disclosure of the present invention, the term "hydrocarbon emission" is defined as the gaseous and/or liquid vapor material which is rich in the volatile or low boiling components such as those found in petroleum fuels such as gasoline, alcohol fuels, and the like. These volatile components include, but are not limited to, materials which are classically referred to as "hydrocarbons"; i.e. organic compounds containing hydrogen and carbon. As used herein, the term "hydrocarbon emissions" can also include other volatile organic and inorganic compounds not generally classified as hydrocarbons. It is anticipated that the device and process of the present invention can successfully control the level of volatile emissions containing a variety of compounds.

The device of the present invention can be successfully employed in a variety of fluid transfer operations. One particular type of fluid transfer operation for which the device of the present invention is particularly suited refueling operation for the transferring fuel to automotive vehicles. As used herein, the term "automotive vehicle" is defined to include any and all movable vehicles having on-board fuel tanks accessible through a fuel receiving opening in a fuel filler line to contain and furnish an energy source for an on-board power plant such as an internal combustion engine which can be refueled at fixed refueling stations such as service stations and the like. Examples of "automotive vehicles" include, but are not limited to, passenger cars, trucks, busses, boats, heavy off-road equipment, airplanes, railroad engines and the like.

It is also anticipated that the process and device of the present invention could be employed on devices which transfer large volumes of fuel such as that which would occur in the removal of fuel from a mobile tanker to an underground storage tank by making use of the technology described herein.

The term "refueling operation" as defined herein is, primarily, the process whereby liquid fuel is transferred from a fuel storage site remote from the automotive vehicle into the on-board fuel storage tank of the vehicle. The remote storage site may be either an in-ground storage facility for example a fuel tank such as would be found at a conventional service station, or a fuel tank located on a refueling vehicle such as is employed to refuel large numbers of fleet vehicles or heavy off-road construction machinery. In large volume fuel transfer operations, it is to be understood that fuel transfer can take place from a mobile tanker to an underground storage facility or the like.

The device of the present invention permits transfer of a fluid having a volatile component from a first storage vessel to a second fluid receiving vessel in a manner which prevents contact between the surrounding atmosphere and the fluid in either its liquid or gaseous form. The device includes means for receiving the fluid in the second fuel receiving vessel which includes a fluid filler cap covering the fluid receiving opening of the second vessel. The cap has a flat planar surface having an inner face engagable with the fluid receiving line, an opposed outer face, and at least one fluid receiving aperture extending therethrough, and at least one fitting for effecting positive closure of the fluid receiving aperture between fluid transfer operations. The fluid receiving aperture is permanently positioned in the upper face of the flat planar surface of the filler cap.

The device also includes means for dispensing fluid from the first storage vessel into the second fluid receiving vessel which includes a fluid filler nozzle device releasably matable with the fluid receiving means of the second vessel. The fluid dispensing means includes a fluid directing conduit having a fluid inlet orifice and an opposed fluid outlet orifice and a fitting for effecting positive closure of the fluid outlet orifice between fluid transfer operations. The fitting is mounted on the fluid directing conduit proximate to the fluid outlet orifice and has means for releasably mating with the fitting located in the fluid receiving aperture located on the filler cap and establishing closed fluid communication between the fluid dispensing means and the fluid receiving vessel.

The device also includes means located in proximity to or coaxially with the fluid filler nozzle device for preventing the uncontrolled escape of vapors displaced during the fluid transfer operation into the surrounding atmosphere and a suitable fitting located in the fluid filler cap in connection with a suitable vapor conveying aperture extending through the flat planar surface thereof which is matingly engagable with the means for preventing uncontrolled escape of the vapors generated during fluid transfer operations located in proximity to the fluid filler device. The vapor controlling means include a vapor conveying conduit having a first end in communication with a vapor collection site remote from the fluid dispensing nozzle and a second end distal to the first end. The vapor controlling means also includes a fitting positioned on the second end of the vapor conveying conduit which is capable of releasable mating communication with the vapor conveying fitting located in the second vapor conveying aperture in the fluid filler cap.

As generally depicted in FIG. 1, the device 10, of the present invention is adapted for the transfer of fuel and generally comprises means for dispensing fuel from the remote fuel storage tank 12 into the on-board fuel storage tank 13 of the automotive vehicle 14. The fuel dispensing means includes a fuel filler nozzle device 16 releasably engagable with a fuel receiving opening 18 in the fuel filler line 20 of the automotive vehicle 14.

The fuel filler nozzle device 16 has a fuel directing conduit 22 as well as suitable means 24 for regulating and interrupting fuel flow through the fuel directing conduit 22. As depicted in FIG. 1, the regulating and interrupting means 24 can include a conventional trigger mechanism such as that employed on conventional gasoline nozzle dispensers. Additionally, the regulating and interrupting means can include pressure and backflow sensors which are operable upon automatic shut-off devices (not shown).

In the device of the present invention, the fuel directing conduit 22 of the fuel filler nozzle device 16 has a fuel inlet orifice (not shown) in fluid communication with the regulating and interrupting means 24 and an opposed fuel outlet orifice (not shown) adapted to be brought into fluid engagement with the fuel filler line 20 of the automotive vehicle 14. In conventional refueling devices, the fuel outlet orifice is releasably insertable into the interior of the fuel filler line 20 to establish the requisite fluid communication. In the present invention, the fuel filler nozzle device 16 includes means, generally denoted as 26, for positively and sealingly mating with the fuel filler line 20 to establish a vapor-tight engagement therewith.

The fuel dispensing means also includes suitable means for conveying fuel from the remote storage tank 12 to the fuel inlet orifice of the fuel filler nozzle 16. Such fuel conveying means generally includes a flexible fuel hose 28 having a fuel inlet end and a fuel outlet end. The flexible fuel hose 28 may be constructed of any material and of any construction which will safely convey fuel therethrough and which is non reactive to fuel over an extended period of time. The fuel outlet end of the flexible fuel hose 28 is permanently attached to the fuel inlet of the fuel nozzle device 16 and is in fluid communication therewith. The fuel inlet end of the flexible fuel hose 28 is in communication with suitable pumping and metering means such as fuel pump 30 schematically depicted in FIG. 1. The pumping and metering means generally includes means for sensing fuel level in the on-board fuel storage tank to which the fuel is transferred and for switching off the fuel flow at that point.

It is anticipated that such pumping and metering means may be any of those currently employed to dispense and switch off liquid fuel to automotive vehicles. Such pumping and metering systems can include stationary systems such as those currently employed in co mercial service stations as well as movable tanks such as would be employed to dispense fuel to off-road construction equipment, airplanes and the like. It is to be understood that the self-contained closed loop fuel dispensing system of the present invention can be advantageously employed in conjunction with fuel dispensing stations adapted to provide the limited quantities of fuel to automotive vehicles, particularly to vehicles such as automobiles, trucks and the like. By the term "limited quantities of fuel", it is meant that the system can be advantageously employed to dispense quantities of liquid fuel in less than tanker load volumes with volumes below approximately fifty to two hundred gallons per refueling being preferred. Such quantities generally encompass the refueling needs for most automotive vehicles, particularly those owned and driven by private consumers. These requirements generally entail the dispensing of measured smaller quantities of fuel through relatively constricted openings which are generally not amenable to the liquid transfer techniques which would be employed with large volume transfer operations. However, one skilled in the art to which this device pertains would readily understand that the present invention can be adapted to accommodate larger volumes of fluid upon reading the disclosure herein.

Figure 2:
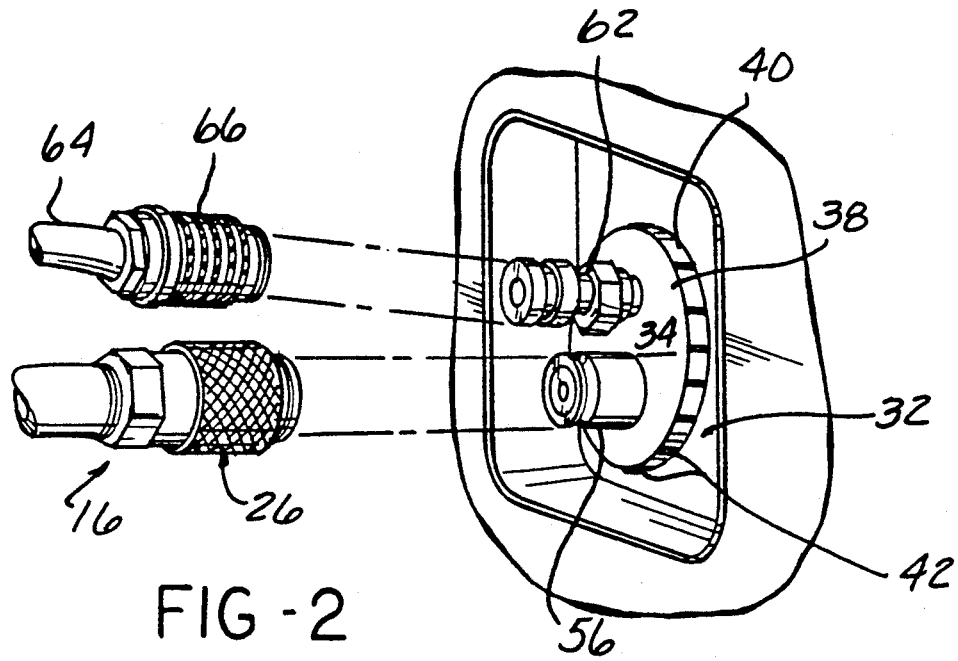
FIG. 2 is a perspective view of a first embodiment of the fuel filler cap and details of the fuel filler nozzle device of the self-contained fuel filler system of the present invention.
Figure 3:
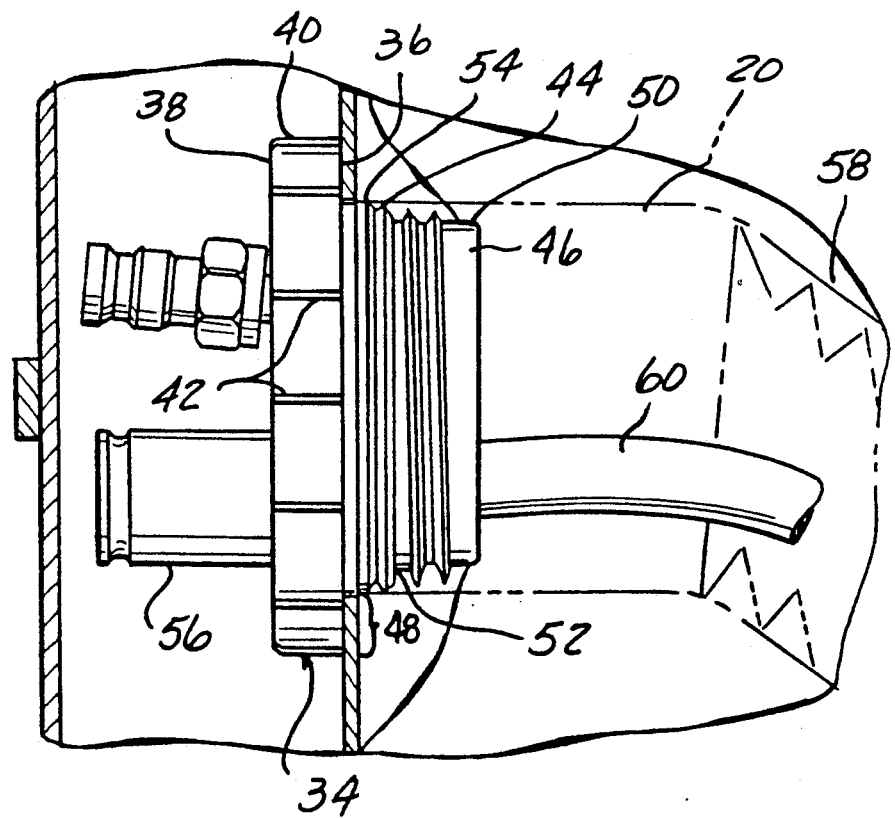
FIG. 3 is a side view of the fuel filler cap of the self-contained fuel filler system of the present invention.

The self-contained closed-loop fuel dispensing system of the present invention as depicted in FIGS. 2 and 3, includes a screwable or unscrewable removable fuel filler cap 32 having means for being sealingly mated with the positive sealing means 26 located on a fuel filler nozzle device 16 of the fuel dispensing means of the present invention. The filler cap 32 described herein is depicted as removable to accommodate refueling operations at non-conforming service stations. It is also within the purview of this invention that the fuel filler cap be permanently affixed to or integrally formed with the fuel receiving opening of on-board storage tank.

The fuel filler cap 32 of the present invention includes an essentially flat planar surface member 34 having an inner face 36 and an outer face 38 and has at least one fuel receiving aperture and, optionally, at least one closed loop vapor-conveying aperture both the fuel receiving aperture and the optional closed loop vapor conveying aperture extend from the inner face 36 to the outer face 38. The flat planar member 34 may have any suitable configuration for its outer perimeter which permits mating attachment of a screwable filler cap.

In the embodiment as depicted in the FIGS. 2, 3 and 4, the flat planar member 34 has an essentially circular outer circumference. The flat planar member 34 has a side surface 40 contiguous with and essentially perpendicular to the outer face 38 of the flat planar member 34. The side surface 40 may have a plurality of spaced ridges or grooves 42, located therein to assist in removal of the filler cap 32 as necessary. The inner face 36 is engagable with the fuel receiving inlet in the fuel filler line 20 of the automotive vehicle 14.

The removable filler cap 32 of the present invention also, preferably, includes suitable sealing means, which may be located proximate to the inner face 36 to effect a vapor-tight seal between the fuel filler line 20 and the fuel filler cap 32 when the filler cap 32 is brought into engagement therewith. In the embodiment as depicted in FIG. 3, the removable filler cap 32 has an annular flange 44 positioned proximate to the inner face 36 which can deformably engage a mating region of the fuel filler line 20 of the automotive vehicle 14 to provide a seal therebetween. Alternately, the sealing means can be adapted to contact the body surface of the automotive vehicle proximate to the fuel filler opening to sealingly engage therewith. It is to be understood that the alternate sealing means would be employed in instances where the fuel filler line is contiguously mounted to the body of the automotive vehicle 14 to provide a vapor tight closed loop connection when the fuel filler cap is connected to it.

As indicated previously, the removable filler cap 32 of the present invention also includes means for maintaining the cap 32 in mating engagement with the fuel filler line 20 of the automotive vehicle 14. While it is within the scope of the present invention that the filler cap 32 be permanently mounted to the fuel receiving end of the fuel filler line 20, it is anticipated that such a configuration would not be feasible until industry-wide standards were adopted mandating the use of mating fuel filler nozzles. In the interim, or during a change-over period, it is preferred that the fuel filler cap 32 be conventionally removable from engagement with the fuel filler line 20 of the automotive vehicle 14. In the embodiment as shown in FIGS. 2, 3 and 4, the fuel filler cap 32 includes an essentially cylindrical projection 46 mounted to and extending perpendicularly outward from the inner face 36 of the flat planar member 34. The cylindrical projection 46 is, preferably, positioned essentially coaxially interior to the periphery of the flat planar member 34 thereby defining a region 48 of the inner face 36 of the flat planar member 34 which is exterior to the cylindrical projection 46. In the preferred embodiment, the exterior region 48 of the flat planar member 34 is in overlying relationship to the body surface of the automotive vehicle 14 proximate to the fuel filler line 20 when the filler cap 32 is sealingly engaged in the fuel filler line 20.

The cylindrical projection 46 has an outer surface 50 facing the exterior region 48 of the flat planar member 34 and an opposed inner surface (not shown). At least a portion of the outer surface 50 has a threaded region 52 which is adapted to be received in a matingly threaded region located on the interior surface of the fuel filler line 20 (not shown). In the preferred embodiment, the annular flange 44 is mounted coaxial to the outer surface 50 of the cylindrical projection 46 and has a compatibly threaded outer surface 54 which sealingly engages a corresponding region on the fuel filler line 20 of the automotive vehicle.

The cylindrical projection 46, preferably, has a standard diameter to enable the filler cap 32 of the present invention to readily replace the original equipment fuel filler cap with which the automotive vehicle 14 is equipped. Additionally, threaded engagement between the fuel filler cap 32 of the present invention and the fuel filler line 20 of the automotive vehicle 14 permits the ready removal of the fuel filler cap 32 in the event that refueling is necessary at a refueling station which is not equipped with the compatible portion of the emission abatement device 10 of the present invention.

The fuel receiving aperture and the vapor-conveying aperture of the fuel filler ca 32 of the present invention are located in the flat planar member 34 within the area defined by the inner diameter of the cylindrical projection 46. In this manner, the fuel receiving aperture and the vapor-conveying aperture are placed in direct contact with the interior of the fuel filler line 20 when the fuel filler cap 32 is in engagement therewith.

The fuel filler cap 32 of the present invention includes at least one fitting 56 permanently positioned in the fuel receiving aperture in the flat planar member 34 of the fuel filler cap 32. As shown in FIGS. 2 and 3, the fitting 56 is a male element which extends outward from the outer face 38 of the flat planar member 34 to engage a mating female fitting on the fuel dispensing device. As shown in FIG. 4, fitting 56' is a female element which has a lower profile with respect to the outer face 38 of the flat planar member 34 so as to be essentially flush with that surface. If desired, the fitting 56' can be countersunk within the flat planar member 34 to achieve a suitably flush surface arrangement.

The fitting 56, 56' may be any suitable device which can be matingly connected with a compatible fitting located on a suitably configured fuel filler nozzle device 16 of the fuel dispensing device which will be discussed in detail subsequently. The fitting 56, 56' employed in the fuel receiving aperture is one which is capable of effecting positive closure of the fuel receiving aperture when the fitting 56, 56' is disengaged from contact with the mating portion carried adjacent to the fuel filler nozzle device 16. Suitable fittings are commercially available from a variety of sources. Examples of suitable fittings include those commercially available under the commercial tradename Parker, Bruning NonSpill Quick Couplings from the Parker, Bruning Corporation of Cleveland, Ohio. Such fittings also employ flush valving when connecting or disconnecting the two fitting members. The flush valving permits the valves to be mated together such that only small amounts of fluid can possibly be lost during disconnection. Such an arrangement results in positive closure of the fitting 56, 56' and associated fuel receiving aperture when the fitting 56, 56' is disengaged from the mating portion of the fuel filler nozzle device 16. The fitting 56, 56' employed will, preferably have a fuel receiving opening which can be actuated upon connection of a suitable mating fitting. The fitting 56, 56' will, preferably, have an opening with an inner diameter sufficient to permit the essentially unrestricted flow of liquid fuel therethrough into the fuel filler line 20 of the automotive vehicle 14 and, ultimately, into the on-board fuel tank 13.

In order to overcome constrictions present in many fuel lines 20 caused by restriction baffles 58 which are placed in the fuel lines 20 of many vehicles 14 to prevent backflow of portions of the fuel introduced into the automotive vehicle during the refueling operation, a flexible sleeve 60 can be mounted on the inner face 36 of the fuel filler cap 32. The flexible sleeve 60 preferably extends perpendicularly inward from the inner surface 36 with a length sufficient to engage and compress the baffle means 58 and define an unobstructed fuel passage therethrough. The flexible sleeve 60 is, preferably, mounted so as to encompass at least the fuel receiving aperture within its defined diameter. In this manner all fuel introduced through the fuel receiving aperture, is conveyed in the flexible sleeve 60 into the fuel line 20 at a location remote from the fuel receiving opening 18. The flexible sleeve 60 may be made of any flexible fuel resistant material such as Tygon, or the like.

In order to prevent or restrict the discharge to the surrounding atmosphere of gaseous and/or vaporous compounds displaced from the on-board fuel tank and the fuel filler line 20 during refueling operation the emission abatement device 10 of the present invention also includes means for collecting displaced chemical compounds. The device may be coaxially mounted with the fuel dispensing means or may be mounted separately as shown in FIGS. 2, 3 and 4. The emission collection means, preferably, includes a fitting 62, 62' which is sealingly mounted in a vapor conveying aperture of the fuel filler cap 32 of the present invention. The fitting 62, 62' is adapted to matingly engage with a fitting such as fitting 66 shown in FIG. 2 or other suitable mating member permanently associated with a collection device positioned remote to the automotive vehicle.

As shown in FIGS. 2 and 3, the fitting 62 can be a male fitting which extends outward from the outer surface 38 of the flat planar member 32 to engage a suitable mating female fitting associated with the hydrocarbon collection device. Alternately, as shown in FIG. 3, the fitting 62' may be a female element having a lower profile with respect to the outer face 38 of the planar member 34 so as to lie essentially flush with that surface. As with fitting 56', fitting 62' can be countersunk within the flat planar member 34 to achieve a suitably flush surface arrangement. It can be appreciated that the flush arrangement provided by female fittings 56', 62' will provide a fuel filler cap with a profile which is aesthetically pleasing and which can be employed easily in areas with small clearances.

In either embodiment, the fuel delivery fitting 56, 56' sufficiently differs in shape or contour from the vapor conveying fitting 62, 62' to prevent accidental cross connection of the two fittings. Alternately, it is also possible to include a male or a female fitting such as elements 56, 62 on the flat planar member 34 to prevent accidental cross connection.

The emission collection device of the present invention also includes a suitable vapor conveying conduit 64 having a first vapor receiving end and a second vapor outlet end 100. The vapor outlet end is connected to a suitable collection receptacle. A fitting element 66 is permanently positioned in overlying relationship with the first vapor receiving end of the vapor conveying conduit 64. The fitting 66 employed is, preferably, one which will releasably engage a mating fitting 62 located on the fuel filler cap 32. When the two fittings 62, 66 are in mating engagement, a closed loop conduit is established between the fuel filler nozzle 20 of the automotive vehicle 14 and the vapor conveying conduit 64. Preferably, the mating fittings 62, 66 both include means for effecting sealing closure of the respective openings on the fuel filler cap 32 and the vapor conveying conduit 64. In the preferred embodiment, the mating fittings 62, 66 are quick connect coupling members such as those described previously having a smaller inner diameter than the fittings employed in the fuel delivery conduit.

The vapor and/or gaseous emissions displaced during the refueling operation which are conveyed through the vapor conveying conduit can be collected in any suitable environmentally safe manner. In the preferred embodiment, the second vapor outlet end 100 of the vapor conveying conduit 64 is maintained in fluid communication with the remote fuel storage tank 12 in a suitable manner which will be described in detail subsequently. In this manner, the vapor and/or gaseous emissions thus produced are directed back into the storage area to be collected and recondensed or suitably processed in a safe and efficient manner.

The vapor conveying conduit 64 of the present invention is preferably mounted on or closely adjacent to the fuel directing conduit 22 of the fuel filler nozzle device 16 of the present invention to permit simultaneous or sequential engagement of the two sets of mating fittings 62, 66 and 26, 56 in preparation for the dispensing of fuel into the fuel filler line of the automotive vehicle.

In order to assist the conveyance of the vapor and/or gaseous emissions produced during the refueling operation away from the automotive vehicle 14 and into the appropriate storage site 12, the device of the present invention may also optionally include suitable means for vapor and/or gaseous emissions through the vapor conveying conduit 64.

In the preferred embodiment of the present invention as depicted in FIG. 5, the vapor outlet end 100 of the vapor conveying conduit 64 is equipped with a suitable quick connect coupling member 102 which is matingly engagable with a compatible quick connect coupling member 104 positioned on and extending through the cap cover 106 which sealingly closes the fuel filler opening located in the neck 108 of the conventional fuel storage tank of the remote fuel storage tank (shown in phantom in FIG. 5).

The quick connect coupling members 102 and mating coupling member 104 may be any suitable members capable of establishing communication between the vapor conveying conduit 64 and the remote fuel storage tank when the two members 102, 104 are engaged. In the preferred embodiment, the quick connect coupling member 102, 104 are capable of sealingly closing the respective apertures with which they are associated when the members are uncoupled from one another.

In the preferred embodiment, the vapor conveying conduit 64 passes through a suitable underground pipe 110 (shown in cross-section in FIG. 5) which extends from the fuel pump to the outer service opening 112 surrounding the neck 108 of the remote fuel storage tank to protect the conduit. A terminal segment of the vapor conveying conduit 64 spans the distance to the cap cover 106 through the outer service opening 112 to permit coupling of the two members 102, 104 to enable the fuel vapors to pass safely into the remote fuel storage tank.

When transfer of fuel to the remote fuel storage tank is required, the two members 102, 104 can be uncoupled and the fuel filler cap cover 106 removed. Because the vapor conveying conduit 64 is, preferably, made from a flexible material, the conduit and coupling member 102 can be temporarily positioned in the outer service opening 112 in a manner which does not interfere with fuel transfer operations. When the transfer of fuel into the remote fuel storage tank is complete, the cap cover 106 can be replaced and the members 102, 104 recoupled to re-establish communication between the vapor conveying conduit 64 and the remote fuel storage tank.

Existing fuel dispensing systems such as gasoline filling stations can readily be retrofitted to accommodate the vapor conveying system of the present invention with minimal excavation between the existing pump and the existing fuel filler opening to the remote fuel storage tank to install the vapor conveying conduit 64 and surrounding underground pipe 110. The cap cover 106 on the remote fuel storage tank either can be retrofitted to include the suitable coupling member 104 or can be replaced by a new cap cover of the design of the present invention.

It is anticipated that removal of fuel from the fuel storage tank 12 located at the remote fuel storage site during refueling operations will require a suitable influx of a comparable volume of make-up air or other gaseous material. In conventional systems, the make-up gas can be drawn from any of a variety of sources including make-up air external to the fuel storage tank. In the process as outlined employing the device of the present invention, the fuel delivery conduits and the vapor conveying lines are connected in an essentially closed circuit. Thus removal of a given volume of fuel from the fuel storage vessel remote from the automotive vehicle 14 would necessitate the recovery of an appropriate volume of make-up gaseous material creating a slight pressure differential between the pressure present in the remote fuel storage vessel 12, the vapor conveying line in contact therewith, and the on-board storage tank 13 on the automotive vehicle 14. The pressure differential is equalized by drawing vapor and/or gasses displaced from the on-board storage tank 13 during the refueling operation through the vapor conveying conduit 64 toward and into the remote fuel storage tank 12.

The means for removing the vapor and/or gaseous material displaced during the refueling operation through the vapor conveying conduit 64 can also include optional intermediate storage tanks 68 for temporarily holding and processing the vapor and/or gaseous emissions as well as various vapor processing and monitoring devices (not shown). These devices, if present, are located in contact with the vapor conveying conduit 64. Suitable devices for processing displaced vapor can include venturi condensers which can initiate and encourage recondensation of the fuel vapors into liquid fuel for reprocessing and eventual reuse as well as various sensors, metering devices and the like. These devices can be disposed in the vapor conveying conduit 64 in any manner which will not impede the ready passage of make-up gas through the circuit and the contemporaneous delivery of fuel to the on-board storage tank 13 of the automotive vehicle 14.

If desired, the vapor conveying conduit 64 can also include suitable pump devices to assist in the removal of vapor displaced during the refueling operation from the refueling site and into a suitable vapor collection vessel such as the remote fuel storage tank. If employed, it is generally preferred that these pumps be capable of drawing a vacuum on the vapors displaced from the on-board fuel tank 13 and the vicinity, located at the junction in the conveying line and capable of conveying the displaced vapors emissions on through the conveying line 64 thereby.

The vapor conveying conduit 64 of the present invention may be constructed of any suitable material which is essentially impervious to reaction with or permeation by the materials to be conveyed therethrough. Preferably, the material of choice would be a flexible polymeric material which could be bent or contoured to accommodate various orientations for the fittings located on the fuel filler cap.

The device 10 of the present invention may be equipped with suitable sensors to prevent the dispensing of fuel without the engagement of the two sets of mating fittings. Similarly, if desired, the device of the present invention, can also include suitable fuel level sensing devices to prevent overfilling of the on-board fuel tank 13 in the automotive vehicle 14.

To dispense fuel to an automotive vehicle using the device of the present invention, the conventional fuel filler cap located on the automotive vehicle is replaced with the fuel filler cap 32 of the present invention. When refueling is required, the fuel filler cap 32 of the present invention is rendered accessible, if necessary, and the fuel filler nozzle device 16 of the present invention is employed. The fuel fitting 26 located on the fuel filler nozzle device 16 is brought into engagement with the mating fitting 56, 56' located on the fuel filler cap 32. The fitting 66, 66' located on the hydrocarbon emission conveying line 64 is brought into contact with the mating fitting located on the fuel filler cap 32 thereby establishing a closed loop through which the fuel and vapor displaced thereby can pass. After the appropriate amount of fuel is dispensed, the two fittings can be disengaged and the fuel filler nozzle device returned to its storage position. Refueling operations are then complete and the automotive vehicle can proceed on its way.

Thus, the device of the present invention provides a closed loop system whereby liquids having a volatile component can be transferred in a safe manner which permits little or no displaced vapors to escape into the surrounding atmosphere.

What is claimed is:

1. An apparatus for introducing fuel into an on-board fuel storage tank of an automotive vehicle, the automotive vehicle having a fuel filler line with a fuel receiving opening and vapor escape baffles located in the interior of the fuel line, the volatile fuel introductions occurring with reduced discharge of organic vapors and fuel into the surrounding atmosphere, the apparatus comprising:
   means for receiving fuel into the on-board storage tank of the automotive vehicle, the fuel receiving means including a fuel filler cap matingly engagable in the fuel receiving opening of the automotive vehicle, the cap having:
   a) an essentially flat planar surface member overlaying the fuel receiving means, the flat planar surface of the fuel filler cap having an inner face oriented toward the fuel filler line of the automotive vehicle, an opposed upper face, ad at least one fuel receiving aperture extending therethrough;
   b) at least one fitting for effecting positive closure of the fuel receiving aperture between refueling operations, the fuel receiving aperture fitting permanently positioned int he upper face of the flat planar surface of the fuel filler cap;
   c) means for maintaining vapor escape baffles located in the fuel filer line of the automotive vehicle in an open position during the introduction of fuel therethrough; and
   d) means for maintaining the cap in sealing engagement with the fuel receiving opening of the fuel filler line;
   means for dispensing fuel from a fuel storage site remote from the automotive vehicle into the on-board fuel storage tank of he automotive vehicle, the fuel dispensing means comprising:
   a) a fuel filler nozzle device releasably engagable with the fuel receiving means of the automotive vehicle, the fuel filler nozzle device having a fuel directing conduit and means for regulating and interrupting fuel flow through the fuel directing conduit, the fuel directing conduit of the fuel filler nozzle having a fuel inlet orifice and an opposed fuel outlet orifice, ad a fitting for effecting positive closure of the fuel outlet orifice between refueling operations, the fitting mounted on the fuel directing conduit of the fuel filler nozzle proximate to the fuel outlet orifice, the fitting having means for releasably mating with the fitting located in the fuel receiving aperture located in the fuel filler cap and establishing closed-loop fluid communication between the fuel dispensing means and the fuel receiving means located on the automotive vehicle; and
   b) means for conveying fuel from the remote storage tank to the fuel dispensing closed loop matingly positive closure fitting inlet orifice of the fuel filler nozzle.

2. The apparatus of claim 1 wherein means for maintaining the fuel filler line in an open position during introduction of fuel therethrough comprises a sheath having a first end mounted to and projecting inward from the inner face of the flat planar member of the fuel filler cap in a fluid-tight manner and a diameter sufficient to encompass the entire aperture located in the flat planar member, the sheath being of a sufficient length such that the sheath projects into the fuel filler line of the automotive vehicle when the filler cap is in sealing engagement therewith.

3. The apparatus of claim 1 further wherein fitting for effecting positive closure of the aperture in the filler cap is a quick connect coupling member and the fitting for effecting positive closure of the fuel dispensing nozzle is a mating quick connect coupling member, the quick connect coupling member located on the fuel filler cap being adapted to matingly receive the corresponding quick connect coupling member positioned as the fitting on the fuel dispensing nozzle.

4. The apparatus of claim 1 further comprising:

means, located in proximity to the fuel filler nozzle device, for preventing uncontrolled escape of fuel vapors from the fuel tank of the automotive vehicle into the surrounding atmosphere during introduction of fuel into the on-board storage tank of the automotive vehicle; and a fitting located in the fuel filler cap positioned in a second, vapor-conveying aperture extending through the flat planar surface thereof, matingly engagable with the means for preventing uncontrolled escape of the fuel vapors located in proximity to the fuel filler device.

5. The apparatus of claim 4 wherein the means for preventing the uncontrolled escape of fuel vapors displaced from the fuel tank of an automotive vehicle comprises:

a vapor conveying conduit having a first end in fluid communication with a vapor collection site remote from the fuel dispensing nozzle and a second end distal to the first end; and a fitting positioned on the second end of the vapor conveying conduit, the fitting being capable of releasable fluid communication with the vapor-conveying fitting located in the second vapor-conveying aperture in the fuel filler cap.

6. The apparatus of claim 5 wherein the means for preventing the uncontrolled escape of fuel vapors from the fuel tank of an automotive vehicle further comprises:

means for drawing fuel vapors displaced during introduction of the fuel into the on-board fuel tank of the automotive vehicle through the quick connect vapor-conveying fitting and vapor-conveying conduit into the remote vapor collection site.

7. The apparatus of claim 6 wherein the remote vapor collection site is located proximate to the remote fuel storage tank.

8. The apparatus of claim 7 wherein the remote fuel storage tank has a fuel filler inlet comprising:

a neck integrally connected to the fuel storage tank;

a cap cover releasable and sealingly mounted over said neck, said cap cover including a vapor receiving aperture and a quick connect fitting contained therein;

wherein said vapor conveying conduit further comprises a quick connect fitting connected to said first end, said quick connect fitting matingly connectable to said quick connect fitting located on said cap cover.

9. An apparatus for introducing fuel having a volatile component into an on-board fuel storage tank of an automotive vehicle, the automotive vehicle having a fuel filler lien with a fuel receiving opening, fuel introduction occurring with reduced discharge of organic vapors and fuel into the surrounding atmosphere, the apparatus comprising:

a fuel filer cap matingly engagable in the fuel receiving opening of the automotive vehicle, the fuel filer cap comprising:

an essentially flat planar surface member having an inner surface contacting and perpendicularly overlaying the fuel receiving opening and an opposed outer surface, the flat planar surface member having at least one fuel receiving aperture extending from the outer surface to the inner surface;

a cylindrical projection having an outer surface, the outer surface having a threaded region covering at least a portion thereof, the threaded surface adapted to matingly contact a threaded region located on the fuel filer line, the cylindrical projection extending from the inner surface of the flat planar member perpendicularly outward therefrom at a position essentially coaxially interior of the external circumference of the flat planar member, the fuel-receiving aperture being located interior to an area defined by the inner threaded projection; and a fitting for effecting positive closure of the fuel receiving aperture, the fitting permanently positioned in the fuel receiving aperture and projecting outwardly from the outer face of the flat planar surface member; and means for dispensing fuel from a remote fuel storage tank into the on-board fuel storage tank of the automotive vehicle, the fuel dispensing means having a fuel delivery outlet having a fitting matingly engagable with the fitting mounted the fuel filer cap.

10. The apparatus of claim 9 wherein the fuel filler cap further comprises:

at least one vapor-conveying aperture located in the flat planar surface member in the region defined by the interior of the cylindrical projection;

a fitting permanently positioned in the vapor-conveying aperture, the fitting capable of positive closure of the vapor-conveying aperture and being matingly engagable with suitable means for preventing uncontrolled escape of the fuel vapors located external to the automotive vehicle.

11. The apparatus of claim 10, wherein the fuel filler cap further comprises:

a flexible sheath having a first end mounted to the inner face of the flat planar member interior to the threaded cylindrical member of the filler cap and projecting outward therefrom, the flexible sheath having an internal diameter sufficient to encompass at least the fuel receiving aperture located in the flat planar member, the flexible sheath having sufficient length to project into the fuel filler line of the automotive vehicle and conform to the contours therein when the filler cap is engaged with the fuel receiving opening of the fuel filler line.

12. The apparatus of claim 11 wherein the means for dispensing fuel from a remote fuel storage tank to the on-board storage tank of the automotive vehicle comprises:

a fuel filler nozzle device including a fuel directing conduit having a fuel inlet orifice, the fuel delivery outlet opposed thereto, and a fitting for effecting positive closure of the fuel outlet orifice, the fitting mounted on the fuel directing conduit of the fuel filler nozzle proximate to the fuel delivery outlet, the fitting having means for releasably engaging the fuel receiving fitting located in the fuel filler cap and establishing fluid communication between the fuel dispensing means and the fuel filler line located on the automotive vehicle; and means for conveying fuel from the remote storage tank to the fuel inlet orifice of the fuel filler nozzle;

wherein the external means for preventing uncontrolled escape of the fuel vapors form the automotive vehicle during introduction of fuel thereto is located proximate to the fuel filer nozzle.

13. The apparatus of claim 12 wherein the means for dispensing fuel from a remote storage tank to the on-board storage tank of the automotive vehicle further comprises means for regulating and interrupting fuel flow through the fuel directing conduit.

14. The apparatus of claim 12 wherein the external means for preventing uncontrolled escape of the fuel vapors from the automotive vehicle during introduction of fuel thereto further comprises:
- a vapor conveying conduit having a first end in fluid communication with the remote fuel storage site and a second end;
- a fitting positioned on the second end of the vapor conveying conduit, the fitting in releasable fluid communication with the vapor-conveying fitting located in second vapor-conveying aperture located in the fuel filler cap; and
- means for drawing fuel vapors displaced during the introduction of the fuel into the on-board fuel tank of the automotive vehicle through the vapor-conveying fitting and vapor-conveying conduit into the remote fuel storage tank.

15. The apparatus of claim 7 wherein the remote fuel storage tank has a fuel filler inlet comprising:
- as neck integrally connected to the fuel storage tank;
- a cap cover releasably and sealingly mounted over said neck, said cap cover including a vapor receiving aperture and a quick connect fitting contained therein;
- wherein said vapor conveying conduit further comprises a quick connect fitting connected to said first end, said quick connect fitting located on said cap cover.

* * * * *

UNITED STATES PATENT AND TRADEMARK OFFICE
CERTIFICATE OF CORRECTION

PATENT NO. : 5,295,521  
DATED : March 22, 1994  
INVENTOR(S) : Ram D. Bedi

Page 1 of 3

It is certified that error appears in the above-indentified patent and that said Letters Patent is hereby corrected as shown below:

Column 2, line 43, please delete "ne" and insert --new--.

Column 3, line 9, after nozzle, please insert --.--

Column 7, line 40, please delete "co" and insert --com--.

Column 13, line 63, please delete "introductions" and insert --introduction--.

Column 14, line 7, please delete "ad" and insert --and--.

Column 14, line 12, please delete "int he" and insert --in the--.

Column 14, line 15, please delete "filer" and insert --filler--.

Column 14, line 32, please delete "ad" and insert --and--.

UNITED STATES PATENT AND TRADEMARK OFFICE
CERTIFICATE OF CORRECTION

PATENT NO. : 5,295,521
DATED : March 22, 1994
INVENTOR(S) : Ram D. Bedi

It is certified that error appears in the above-indentified patent and that said Letters Patent is hereby corrected as shown below:

Column 15, line 41, please delete "releasable" and insert --releasably--.

Column 15, line 48, please delete "able" and insert --ible--.

Column 15, line 58, please delete "filer" and insert --filler--.

Column 16, line 3, please delete "filer" and insert --filler--.

Column 16, line 20, please delete "filer" and insert --filler--.

UNITED STATES PATENT AND TRADEMARK OFFICE
CERTIFICATE OF CORRECTION

PATENT NO. : 5,295,521            Page 3 of 3
DATED : March 22, 1994
INVENTOR(S) : Ram D. Bedi It is certified that error appears in the above-indentified patent and that said Letters Patent is hereby corrected as shown below:

Column 16, ine 66, please delete "filer" and insert --filler--.

Signed and Sealed this

Eighteenth Day of October, 1994

Attest:

BRUCE LEHMAN

*Attesting Officer*        *Commissioner of Patents and Trademarks*